J. MASSART.
HARVESTING MACHINE FOR BEET ROOTS AND THE LIKE.
APPLICATION FILED MAY 17, 1909.
1,031,356.
Patented July 2, 1912.
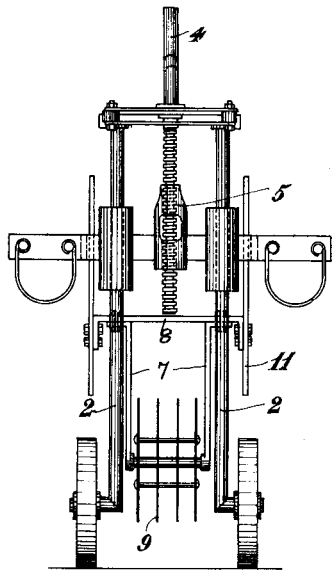
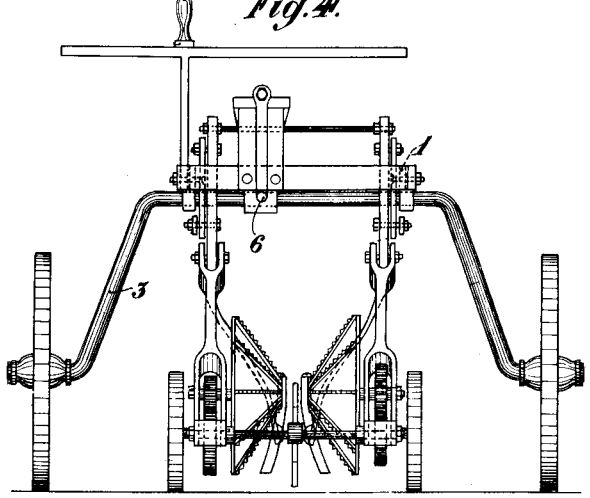

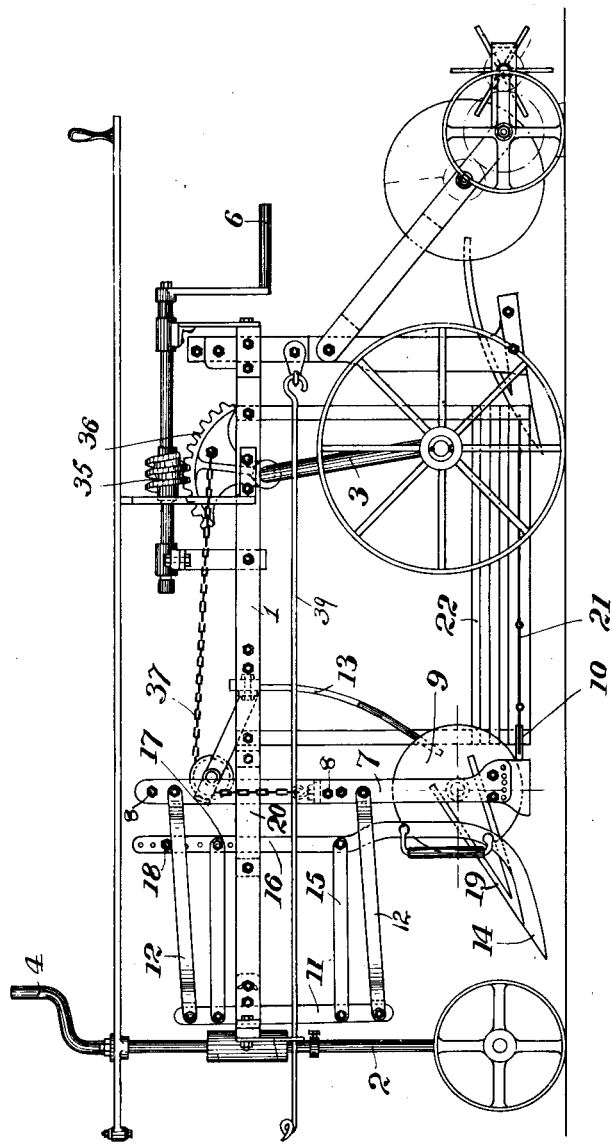

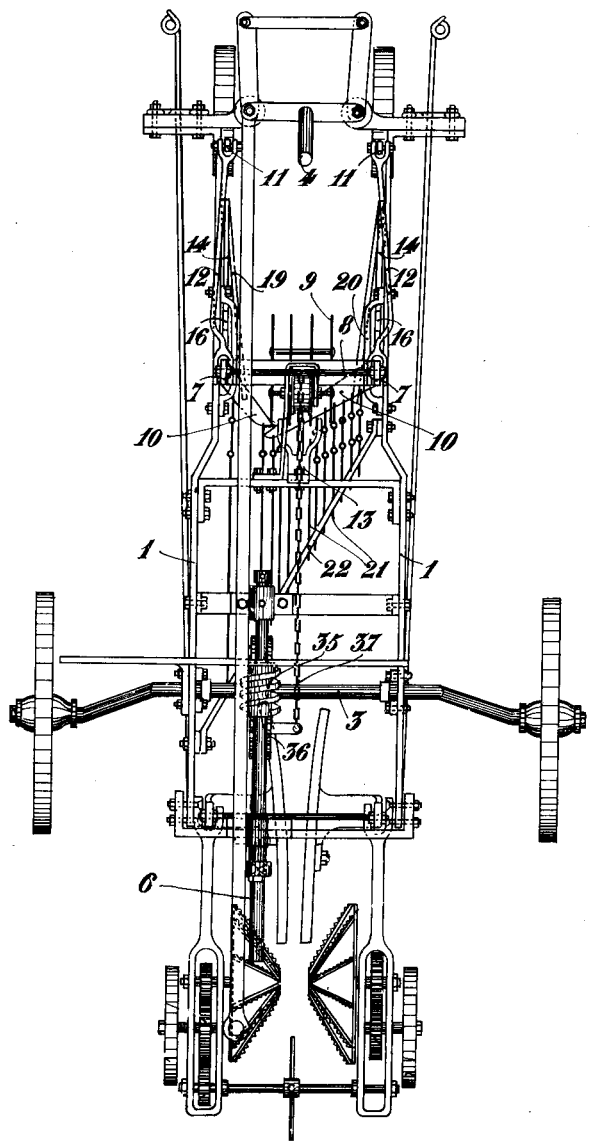

UNITED STATES PATENT OFFICE.

JULES MASSART, OF LANTREMANGE, BELGIUM.

HARVESTING-MACHINE FOR BEET-ROOTS AND THE LIKE.

1,031,356.      Specification of Letters Patent.      Patented July 2, 1912.

Application filed May 17, 1909. Serial No. 496,493.

*To all whom it may concern:*

Be it known that I, JULES MASSART, subject of the King of Belgium, residing at Lantremange, Belgium, have invented certain new and useful improvements in Harvesting-Machines for Beet-Roots and the Like; and I hereby declare the following to be a full, clear, and exact description of the invention, such as will enable others skilled in the art to which it appertains to make and use the same.

The present invention relates to improvements in machines for topping beets or other root like plants and the object of the invention is to provide a simple and durable machine which will sever the crown and leaves from the top of a beet and collect the severed crowns and deposit the same in piles at one side of the machine.

In the accompanying drawings, Figure 1 is a side elevation of a machine constructed in accordance with the present invention; Fig. 2 is a plan of the same; Fig. 3 is a front elevation; Fig. 4 is a rear elevation.

Referring to the drawings the main supporting frame of the machine comprises a pair of longitudinally extending bars 1 which are supported by a pair of main ground wheels carried by an axle 3 and smaller front, steering wheels each supported by a vertically arranged member 2. By means of a crank 4 connected with a screw engaging an internally threaded socket 5 connected with the front wheel supports 2, it is possible to adjust the forward end of the frame vertically and the rear portion thereof may be adjusted by means of a crank 6. The latter is connected with a shaft carrying a worm 35 which engages with a segment 36 connected to the rear axle 3 and as the crank 6 is turned said rear axle will be rocked about its bearings in the frame bars 1 to vary the height of such bars from the ground.

The topping devices proper comprise in the form of the invention illustrated two cutting blades 10 which are supported in a substantially horizontal position at the lower end of a pair of upright bars 7. The latter are each supported by a pair of links 12 which are pivotally connected to vertically arranged bars 11 that in turn are pivoted upon the frame bars 1. Each cutter blade is therefore supported by a pair of parallel links so that it is free to move vertically. Said blades as shown in Fig. 2 are arranged obliquely or inclined inwardly from their forward to their rear ends and between the supports 7 in advance of said blades is mounted a guide roll comprising a plurality of spaced concentric disks 9. Said roll is adapted to pass over the top of beets in the path of the cutting blades and to effect a vertical adjustment of the supports 7 and said blades so that the depth of the crown removed thereby will be uniform although the beets from which the crowns are severed project different distances above the surface of the ground.

The crowns severed in the manner described are received upon and supported by a series of rods 21 arranged between the cutting blades 10 and a diagonally arranged deflecting board or abutment 22 which is supported from the side bars 1 of the main frame by suitable depending hangers. As shown said rods 21 preferably comprise a plurality of sections linked or pivotally connected so that a flexible connection is provided between the cutting blades and said rods, which, as shown in the drawings, are directly connected to said blades. Therefore the rods 21 do not interfere with the free vertical movement of the cutting devices as before explained. It will be understood that the rear portions of the rods 21 and the lower surface or edge of the deflecting board 22 rest upon the ground when the machine is in use so that the severed crowns may contact with the ground surface over which they are moved when adjacent said board. The construction of said rods and the connection thereof with the cutting devices are such that the latter can be freely adjusted vertically without shifting the board 22. Said rods 21 are spaced apart so that any dirt falling thereon with the crowns and leaves may escape. Preferably the spaces separating said rods are gradually reduced in width toward the deflecting board 22 so that in case any portion of a severed crown extends below the plane of said bars when adjacent the cutting blades 10, such crown will be gradually raised until it rests entirely above said rods. The construction and arrangement of the rods and board 22 is such that as the machine is moved forward the severed crowns will collect against the forward face of said board and be gradually moved transversely of the machine and deposited in small heaps at one side thereof. The machine is also provided with means for raising any leaves which may have been depressed below the upper surface of the beet and as shown this is effected by two inclined forwardly projecting members 14 each of which is supported by an arm 16 carried by a pair of links 15 pivotally connected to the aforesaid members 11. The arms 16 extend above the upper links 12 and are provided with laterally projecting pins 18 which extend across the upper edges of said links whereby said leaf raising devices will be moved vertically with the supports for the cutting blades. The arms 16 are provided with a plurality of holes each adapted to receive the pin 18 so that the relative position of said leaf raiser and the cutting blade may be varied as desired. The leaf raising slides 14 are so constructed and supported that they do not penetrate deeply the downward movement thereof being limited by a stop 17 on one of the arms 16 engaging with the upper edge of one of the main frame bars 1. The supports 16 are also provided with a series of forwardly inclined plates 19 which are adapted to form supports for the leaves that project laterally and prevent the same from becoming entangled with other parts of the machine. Guide straps 20 hold the vertically movable members 16, 7, against lateral movement.

The cutter supporting bars 7 are connected by a transverse bar 8 to which is attached one end of a chain 37 which extends over a suitable guide wheel or pulley and is connected with the segment 36 so that by moving said segment the cutter will be raised or lowered as desired. To prevent leaves from becoming entangled in the controlling roller 9, a fork 13 is supported by the main frame, and has its prongs extending into spaces separating the disks of said roller.

The devices hereinbefore described may be combined with any suitable means for digging or removing the bodies of the beets from the ground and cleaning such bodies from any adhering masses of earth.

The drawings illustrate a particular form of digging and cleaning means with which the topping devices hereinafter claimed have been practically combined, but no claim is herein made to such features of the machine illustrated as they will form the subject-matter of divisional applications.

The operation of the several parts will, it is believed, be clear from the foregoing description in connection with the drawings.

Having thus described the invention what is claimed and desired to be secured by Letters-Patent is,

1. In a machine for topping beets, the combination of a supporting frame, a cutting means adapted to sever the crown from the body of a beet in its path, a series of substantially horizontally arranged rods extending longitudinally of the machine immediately in rear of said cutter and adapted to receive and support the severed crowns, and means extending over said rods for causing the crowns to move laterally thereof and be discharged at one side of the machine.

2. In a machine for topping beets, the combination of a supporting frame, a cutting means adapted to sever the crown from the body of a beet in its path, a series of substantially horizontally arranged rods extending longitudinally of the machine immediately in rear of said cutter and adapted to receive and support the severed crowns, and a deflector extending obliquely across said rods to cause the crowns to be discharged therefrom at one side of the machine.

3. In a machine for topping beets, the combination of a supporting frame, a cutting means adapted to sever the crown from the body of a beet in its path, means for adjusting said cutting means vertically, a relatively stationary deflector 22 supported by the frame in rear of the cutting means, and a plurality of spaced rods connecting said deflector and cutting means and receiving beet crowns severed by the latter, the parts being arranged to permit vertical adjustment of the cutting means independent of any movement of the deflector.

4. In a machine for topping beets, the combination of a supporting frame, a cutting means adapted to sever the crown from the body of a beet in its path, an apertured support for the severed crowns extending rearwardly from said cutting means and directly connected thereto by means permitting free relative vertical movement between said parts, and means for causing the crowns to be discharged from said support at one side of the machine.

5. In a machine for topping beets, the combination of a wheeled supporting frame, two horizontal cutting blades inclined in opposite directions from their forward to their rear ends, a series of rods connected with and extending rearwardly from said blades to receive and support the beet crowns severed by the blades, and means for discharging such crowns from said support.

6. In a machine for topping beets, the combination of a wheeled supporting frame, a horizontally arranged cutter suspended from the frame by means permitting vertical adjustment thereof, an obliquely arranged deflector stationarily supported by the frame in rear of the cutter, and a series of rods flexibly connecting the cutter and deflector, for the purpose described.

7. In a machine for topping beets, the combination of a wheeled supporting frame, a horizontally arranged cutter suspended from the frame by means permitting vertical adjustment thereof, a guide roll connected with the support for the cutter and adapted by contact with the top of a beet to automatically effect vertical adjustment of the cutter, an obliquely arranged deflector stationarily supported by the frame in rear of the cutter, and a series of rods flexibly connecting the cutter and deflector, for the purpose described.

8. In a machine for topping beets, the combination of a wheeled supporting frame, vertically movable members 7 supported by said frame at opposite sides thereof, a cutting blade attached to the lower end of each of said members, a guide roller supported by said members in advance of the cutters and adapted to effect vertical movement of the latter, leaf raising means arranged in front of and adapted to move vertically with the cutters, and means in rear of the blades for receiving the crowns severed thereby.

In testimony whereof I affix my signature in presence of two witnesses.

JULES MASSART.

Witnesses:
VICTOR HAMAL,
AUGUSTE BOURGUIGNON.